United States Patent
Hsu et al.

(10) Patent No.: US 9,935,981 B2
(45) Date of Patent: Apr. 3, 2018

(54) DYNAMIC TUPLE FOR INTRUSION PREVENTION SYSTEMS

(71) Applicant: International Business Machines Corporation, Armonk, NY (US)

(72) Inventors: Sheng-Tung Hsu, Taipei (TW); Cheng-Ta Lee, Taipei (TW); Joey H. Y. Tseng, Taipei (TW); Rick M. F. Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/857,977

(22) Filed: Sep. 18, 2015

(65) Prior Publication Data
US 2017/0085590 A1    Mar. 23, 2017

(51) Int. Cl.
*H04L 29/06* (2006.01)
*H04L 9/32* (2006.01)

(52) U.S. Cl.
CPC .......... *H04L 63/20* (2013.01); *H04L 63/1441* (2013.01)

(58) Field of Classification Search
CPC ........................... H04L 63/20; H04L 63/1441
USPC ...................... 726/1; 713/166, 168
See application file for complete search history.

(56) References Cited

U.S. PATENT DOCUMENTS

| | | | |
|---|---|---|---|
| 7,882,538 B1 | 2/2011 | Palmer | |
| 8,438,268 B2 | 5/2013 | Mills | |
| 8,516,576 B2 | 8/2013 | Figlin et al. | |
| 8,533,844 B2 | 9/2013 | Mahaffey et al. | |
| 8,590,014 B1 | 11/2013 | Haugsnes | |
| 8,601,530 B2 | 12/2013 | Cohen et al. | |
| 8,776,180 B2 | 7/2014 | Kumar et al. | |
| 8,938,799 B2 | 1/2015 | Kuo | |
| 2004/0068526 A1* | 4/2004 | Singh | G06F 17/30569 |
| 2010/0095348 A1* | 4/2010 | Foster | G06F 21/6236 726/1 |
| 2012/0117622 A1 | 5/2012 | Gronholm et al. | |
| 2013/0054554 A1* | 2/2013 | Cao | G06F 17/30 707/706 |

(Continued)

FOREIGN PATENT DOCUMENTS

CN          103746996 A      4/2014

OTHER PUBLICATIONS

Kassner, Michael; "Next Generation Firewalls: It's all about tuples"; TechRepublic; Nov. 28, 2011; pp. 1-9; <www.techrepublic.com/blog/it-security/next-generation-firewalls-its-all-about-tuples/>.

(Continued)

*Primary Examiner* — Aravind Moorthy
(74) *Attorney, Agent, or Firm* — Alexa L. Ashworth; A. Imtiaz Billah

(57) ABSTRACT

Embodiments of the present invention provide systems and methods for exchanging information. Communications between an intrusion prevention system (IPS) and at least one end-point are facilitated by controlling network traffic flow in an IPS and the at least one end-point and formation of an information plane. The formed information plane allows attributes of the IPS and the at least one end-point to reside in the formed information plane. A network access policy (NAP) works in conjunction with an IPS and leverages created customized network objects (CNOs). Upon analyzing data packets, the data packets may or may not be forwarded to the IPS.

20 Claims, 9 Drawing Sheets

(56) References Cited

U.S. PATENT DOCUMENTS

| | | | |
|---|---|---|---|
| 2013/0074143 A1* | 3/2013 | Bu | H04L 63/1416 726/1 |
| 2013/0268994 A1 | 10/2013 | Cooper et al. | |
| 2013/0298192 A1 | 11/2013 | Kumar et al. | |
| 2013/0298230 A1 | 11/2013 | Kumar et al. | |
| 2014/0351924 A1* | 11/2014 | Myers | H04L 63/029 726/15 |
| 2016/0021135 A1* | 1/2016 | Chesla | H04L 63/02 726/23 |

OTHER PUBLICATIONS

"Firewalls Don't Cut it Anymore—Why You Need Next Generation Firewalls"; My Digital Shield; Aug. 28, 2014; pp. 1-6; <http://www.mydigitalshield.com/firewalls-dont-cut-anymore-need-next-generation-firewalls/>.

* cited by examiner

DYNAMIC TUPLE FOR INTRUSION PREVENTION SYSTEMS

BACKGROUND OF THE INVENTION

The present invention relates generally to the field of network security appliances and more specifically to intrusion prevention systems using a dynamic tuple mechanism.

Network access policy (NAP) defines the protection domain in an intrusion prevention system (IPS). IPS are network security appliances that monitor network and/or system activities for malicious activity. NAP binds the network attributes in the network traffic to a sequence of actions (e.g., packet inspection, web application control, URL filtering, etc.). Packet inspections keep track of the state of the network connection traveling across it.

SUMMARY

According to one embodiment of the present invention, a method for exchanging information is provided, the method comprising the steps of: facilitating, by one or more processors, communications between an intrusion prevention system (IPS) and at least one end-point; configuring, by one or more processors, a network access policy (NAP) wherein the NAP works in conjunction with the IPS; integrating, by one or more processors, a customized network object (CNO) into the NAP, wherein the CNO comprises a set of attributes; utilizing, by one or more processors, retrieved information from the at least one end-point; sending, by the IPS, the set of attributes to a database; and processing, by one or more processors, normalized information comprising the set of attributes and associated value pairs.

Another embodiment of the present invention provides a computer program product for exchanging information, based on the method described above.

Another embodiment of the present invention provides a computer system for exchanging information, based on the method described above.

DETAILED DESCRIPTION

NAPs can help security administrators to enforce the security policy in the environment. NAPs bind the network attributes and relies on the n-tuple which is a collection of attributes and is used to define access requirements. The number "n" of the n-tuple can be different depending on IPS/Firewall solutions. Tuples are directly implemented as the data structure in the NAP policy to facilitate the matching of arbitrary attributes collected from multiple sources. An IPS may make a sequence of responses to results such as accepting packet or dropping the packet. The network attributes are the core of the NAP as they help distinguish network traffic and apply the corresponding actions to it. Currently used network attributes are attributes in the packet content and attributes from the user identity service.

An IPS typically does not have the capability to leverage end-point knowledge in a NAP. Thus, serious difficulties for security administrators arise when protecting the environment because some of the information can only be obtained at an end-point device. For example, when seeing a packet on an IPS device, it is not known if the sender end-point is infected by a virus. Therefore, an IPS device cannot apply different levels of protection based on the risk level in the end-point. The end-point and IPS are currently in different information planes from a security perspective resulting in no mechanism which extends the current network attributes used in NAP to include the end-point attributes. Embodiments of the present invention provide systems and methods for exchanging information between an IPS and End-point device which could be any equipment by enabling intelligent capability into an IPS. The IPS learns about the infrastructure where it is locating and adapts to the infrastructure by providing micro-control of the network traffic and comprehensive security.

Figure 1:
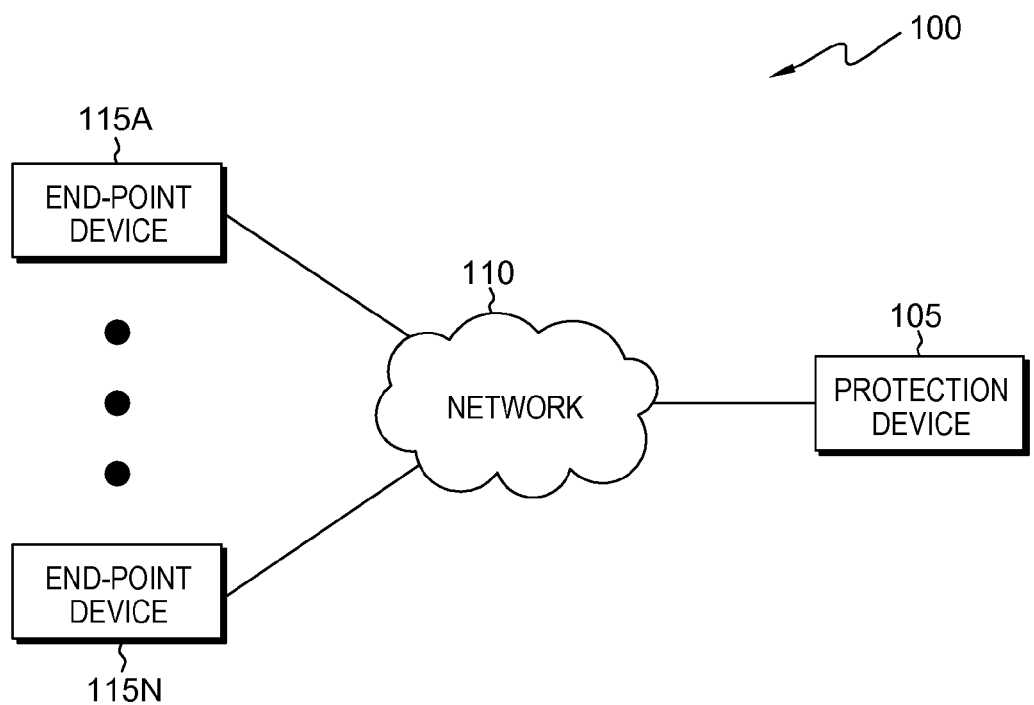
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention.

FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes end-point devices 115A-N and protection device 105 all interconnected via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between protection device 105 and end-point devices 115A-N.

End-point devices 115A-N refer to an "end-point computing system." Such computing systems may include a server, a desktop or laptop PC, a PDA, a Smartphone, a printer, switch or Internet of Things (IoT) devices. In some embodiments, a host is an end-point, such as a conventional desktop PC, typically having a main processor, possibly one or more coprocessors, and typically running an operating system. Additional subsystems such as various peripherals, network interface devices, modems, etc. are sometimes connected to such endpoint hosts for a variety of purposes. In exemplary embodiments of this invention, security functions work to protect end-points and can generally be categorized into two groups: defense functions and immunization functions. The computing device may include internal and external hardware components, as depicted and described in further detail with respect to FIG. 11.

Protection device 105 may constitute firewalls, devices which detect attacks, and intermediate devices which identify network communications. Protection device 105 controls access to protected entities by prohibiting network communications flowing from an end-point device from accessing a protected entity. If an end-point device 115A-N does not have sufficient access rights, then end-point device 115A-N is denied entry into the protected entity by protection device 105. Protection device 105 utilizes intrusion prevention systems (IPS) which are network security appliances that monitor network and system activities for malicious activity (e.g., unauthorized users attempting to access a system). In exemplary embodiments, the IPS can take actions such as sending alarms, dropping malicious packets, resetting a connection, and blocking traffic from an offending IP address.

Figure 2:
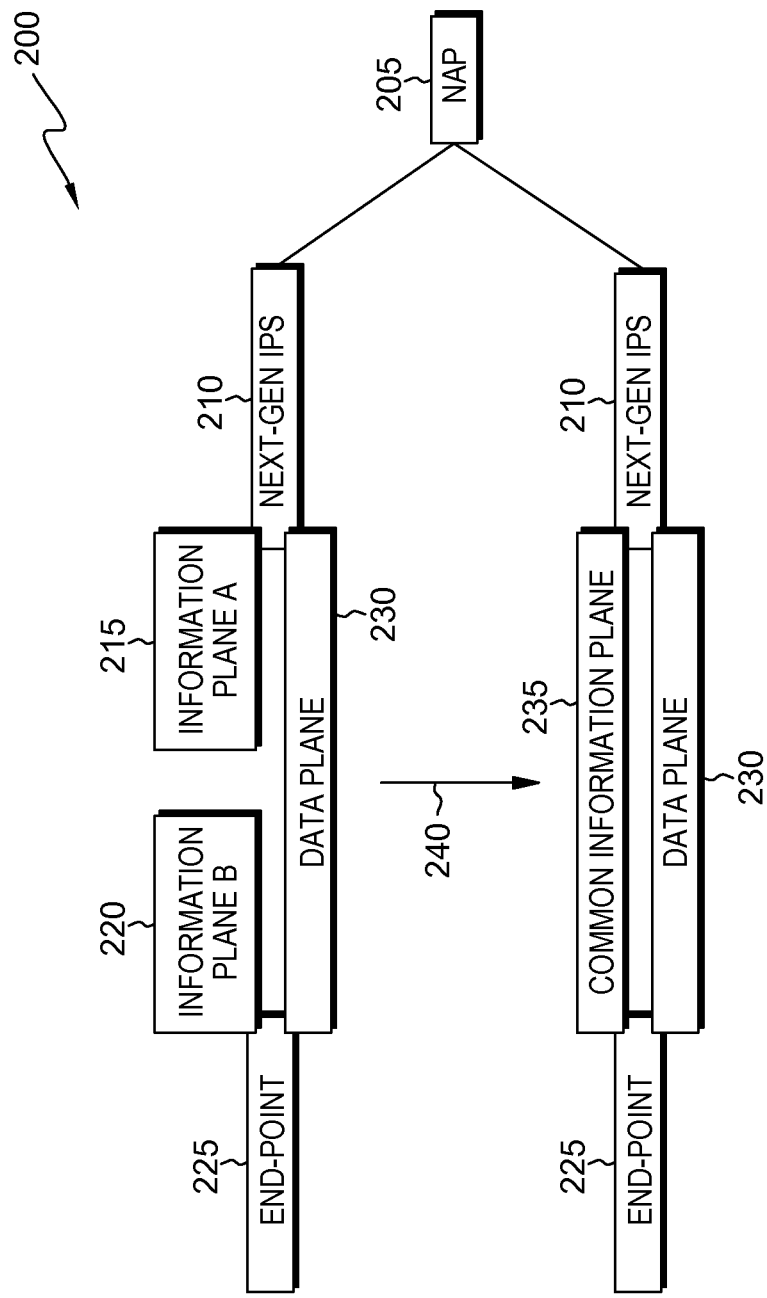
FIG. 2 is a functional block diagram depicting the formation of a common information plane, in accordance with an embodiment of the present invention.

FIG. 2 is a functional block diagram depicting the formation of common information plane 235, in accordance with an embodiment of the present invention.

NAP 205 defines the protection domain in Next-Gen IPS 210 and End-Point 225. In this exemplary embodiment, NAP 205 does not consider the characteristics and situations of the end point. Thus, NAP 205 treats different types of operating systems and devices as the same type of operating systems and devices when analyzing packets for intrusion prevention. NAP 205 binds the network attributes in the network traffic to a sequence of actions (e.g., packet inspections). NAP 205 relies on the n-tuple which is a collection of attributes and is used to define access requirements. Tuples facilitate the matching of arbitrary attributes collected from multiple sources. The core of NAP 205 is a network attribute which distinguishes network traffic and applies corresponding actions upon the network traffic. Data over the Internet comes as a series of packets. For example, e-mail which is sent out, leaves a series of packets. Networks that ship data around in small packets are called packet switched networks. There are two types of network attributes—attributes in a packet content and attributes from the user identity provider. The network attributes can originate directly from an end-point or from a central management service which manages all the end-points. Network attributes are properties of a set of the network elements that control traversability over a network. Properties of network attributes include name; usage type (i.e., specification of how attributes used during analysis as either a cost, descriptor, hierarchy, or restriction); units (e.g., cost, distance, or time units); data type (e.g., Boolean, integer, float, or double data); and use by default (i.e., automatically setting originally configured attributes on a newly created network analysis layer). Descriptors, hierarchy, and restrictions have unknown units. A usage of type of hierarchy is always an integer. A Boolean data type is always appropriate for a usage type of restriction while a Boolean data type is never appropriate for cost units.

Next-gen IPS 210 does not have the capability to extend the n-tuple to the information from client sides or information from other servers. In this exemplary embodiment, next-gen IPS 210 are devices or programs which are used to detect signs of intrusions into networks or systems and take actions. Such actions consist of generating alarms and/or actively blocking intrusions. In some embodiments, next-gen IPS 210 take the form of purpose-built hardware devices, software agents which run on servers, or software programs which run within virtualized environments. In this exemplary embodiment, next-gen IPS 210 is designed to permit allowable network packets except for those that are explicitly disallowed. Information plane 215 only has the IPS built-in information. It does not have any knowledge of end points where provides the information plane 220. The data plane 230 is the actual traffic from/to end-point that inspected by IPS. The network traffic can be scaled to the ISO OSI 7 layer model that include the attributes (e.g., SRC MAC, DST MAC, SRC IP, DST IP, protocol type, and packet raw data) that may be covered in the information plane 215. Next-gen IPS 210 serves as a comprehensive security/access policy enforcement. For example, a different security intelligence platform, Qradar, may implement a rule stating any device having a virus infection cannot access service A. Next-gen IPS 210 can enforce the rule implemented by Qradar at the network edge instead of waiting for Qradar to send an alert.

In this exemplary embodiment, end-point 225 contains characteristics and situations not considered by NAP 205 of next-gen IPS 210 prior to implementing common information plane 235. Information plane 220 has the unique information of end-point 225 that cannot be figured out by inspecting the traffic through the data plane 230 from Next-gen IPS 210 perspective. For example, for the traffic flow between Next-gen IPS 210 and end-point 225, end-point 225 may contain various OS/devices and capability but from Next-gen IPS 210 point of view, it may not identify the difference. This may lead to poor accuracy in identifying the applications, especially the popular web applications with frequent release changes on a daily and/or weekly basis. For the traffic flow from end-point 225 to the next-gen IPS 210, end-point 225 is already well protected by some kind of security software (e.g., Symantec™ and TrendMicro). If end-point 225 is protected by some kind of security software, next-gen IPS 210 may ignore packet inspection. Next-gen IPS 210 focuses on a means to block a connection which violates security policies. Additionally, next-gen IPS 210 may perform different levels of deep packet inspection (i.e., a form of computer network packet filtering that examines the data part of a packet as it passes an inspection point, searching for protocol non-compliance, viruses, spam, intrusions, or defined criteria to decide whether the packet may pass or if it needs to be routed to a different destination, or, for the purpose of collecting statistical information) for different sources and destinations. The level of deep packet inspection could be from none to comprehensive, depending on the health conditions of an end-point.

Attributes are contained within information plane A 215, information plane B 220, and data plane 230. Data plane 230 has the original attributes that can be found in a regular network packet. In this exemplary embodiment, data plane 230 contains attributes that are shared between end-point 225 and next-gen IPS 210, such as SRC MAC, DST MAC, SRC IP, DST IP, protocol type, and packet raw data. Information plane 215 contains information specific to next-gen IPS 210 such as network access control, IP reputation, and URL category, which cannot be leveraged on the end-point side. Information plane 220 contains information specific to end-point 225 such as viruses, malware, operating system information, application information, and user behavior, which cannot be leveraged on the IPS side.

In this exemplary embodiment, next-gen IPS 210 typically does not have the capability to leverage end-point 225 knowledge in NAP 205. Thus, this causes difficulties for security administrators for system protection because some of the information can only be obtained at end-point 225. For example, when next-gen IPS 210 interacts with a packet, it is unknown if the end-point 225 is infected by a virus. Therefore, next-gen IPS 210 cannot apply different levels of protection based on the risk level in end-point 225. Thus, the end-point 225 and next-gen IPS 210 are in different information planes, information plane 220 and information plane 215, respectively. From a security perspective, there is no mechanism to extend the current network attributes used in NAP 205 to include the end-point attribute (e.g., risk level and packets) when the information planes are different.

Next-gen IPS 210 devises mechanism 240 to extend the tuple from next-gen IPS 210 to end-point 225. As depicted in FIG. 2, mechanism 240 acts upon information plane A 215 and information plane B 220 in order to generate common information plane 235 while maintaining data plane 230. Information plane A 215 and information plane B 220 reside on one side of the arrow along with data plane 230. Upon implementing mechanism 240, information plane A 215 and information plane B 220 do not reside on the other side of the arrow while common information plane 235 and data plane 230 reside on the other side of arrow. Prior to implementing mechanism 240, next-gen IPS 210 can only access information plane 215. In this exemplary embodiment, mechanism 240 enables intelligent capability into next-gen IPS 210 by learning about the infrastructure it is in contact with and providing the best micro-control to these network sessions and traffic. By implementing mechanism 240, next-gen IPS 210 can also access attributes in information plane 220 to enrich its policy setting and to facilitate resulting action execution. In this exemplary embodiment, NAP 205 utilizes end-point knowledge as attributes to put next-gen IPS 210 in common information plane 235 in order to bolster security enforcement policy and provide more comprehensive and flexible security. Non-pure packet analysis is applied within common information plane 235 in order to leverage the attributes acquired from end-point 225 to make a decision.

Figure 3:
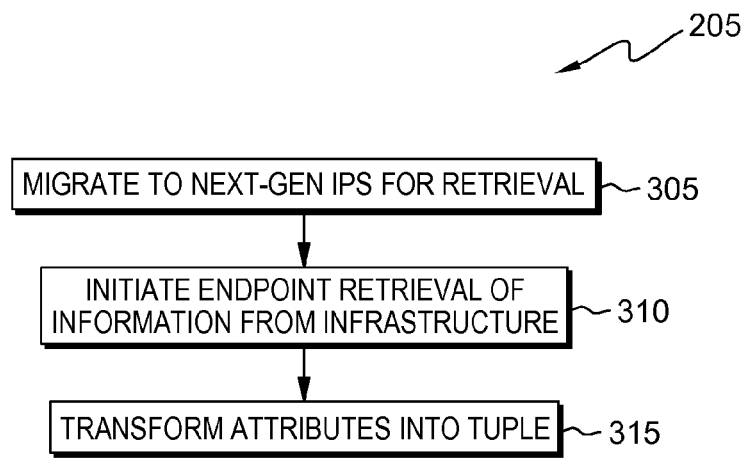
FIG. 3 is a flowchart depicting the operational steps for transforming attributes into a tuple, in accordance with an embodiment of the present invention.

FIG. 3 is a flowchart depicting the operational steps for transforming attributes into a tuple, in accordance with an embodiment of the present invention.

In step 305, NAP 205 migrates to next-gen IPS 210 for information retrieval. Next-gen IPS 210 is connected to a default NAP 205. The information retrieval involves understanding attributes within next-gen IPS 210. In this exemplary embodiment, next-gen IPS 210 contains attributes which are not in the same information plane as the end-point 225.

In step 310, NAP 205 initiates end-point 225 retrieval of information from the infrastructure. In this exemplary embodiment, some of the information from the infrastructure includes asset information, location, connection date, health status, etc. End-point attributes are mapped to network flows sent from end-point 225. Typically, one network flow is equivalent to one connection.

In step 315, NAP 205 transforms network attributes into tuple format. In this exemplary embodiment, these network attributes are transformed into the tuple that can define NAP 205. Network attributes are properties of a set of the network elements that control traversability over a network. End-point 225 knowledge is sent to next-gen IPS 210 for information correlation. Identification of packets from network flows is based on the 5-tuples attributes and the packet raw data.

Figure 4:
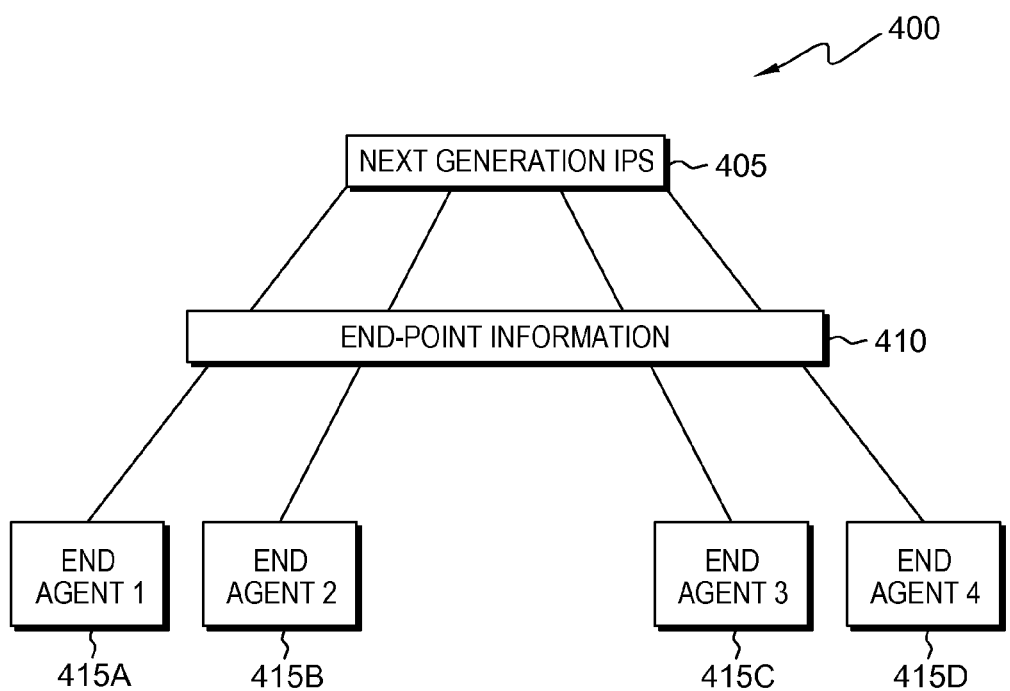
FIG. 4 is a functional block diagram depicting end-point aware network policies, in accordance with an embodiment of the present invention.

FIG. 4 is a functional block diagram depicting end point aware network policies, in accordance with an embodiment of the present invention.

End-points provide information to next-generation IPS 405. End-point information 410 is reported as asset information, location, type of connection (e.g., WiFi or 4G), and health status (vulnerability status, enterprise compliance status, etc.). More attributes are needed to make a decision per network flow in order to maintain performance of end agents 415A-D. End agents are devices which can consume information from the end-point. Thus, additional latency in packet processing and the decrease in performance of end agents 415A-D may result. End agents 415A-D utilize network access control (i.e., a rule based on the network packet itself) as opposed to event correction (i.e., not a rule and relies on multiple facts to make decision). For example, Qradar collects the events from multiple devices to do event correlation in order to produce a security incident alert.

Figure 5:
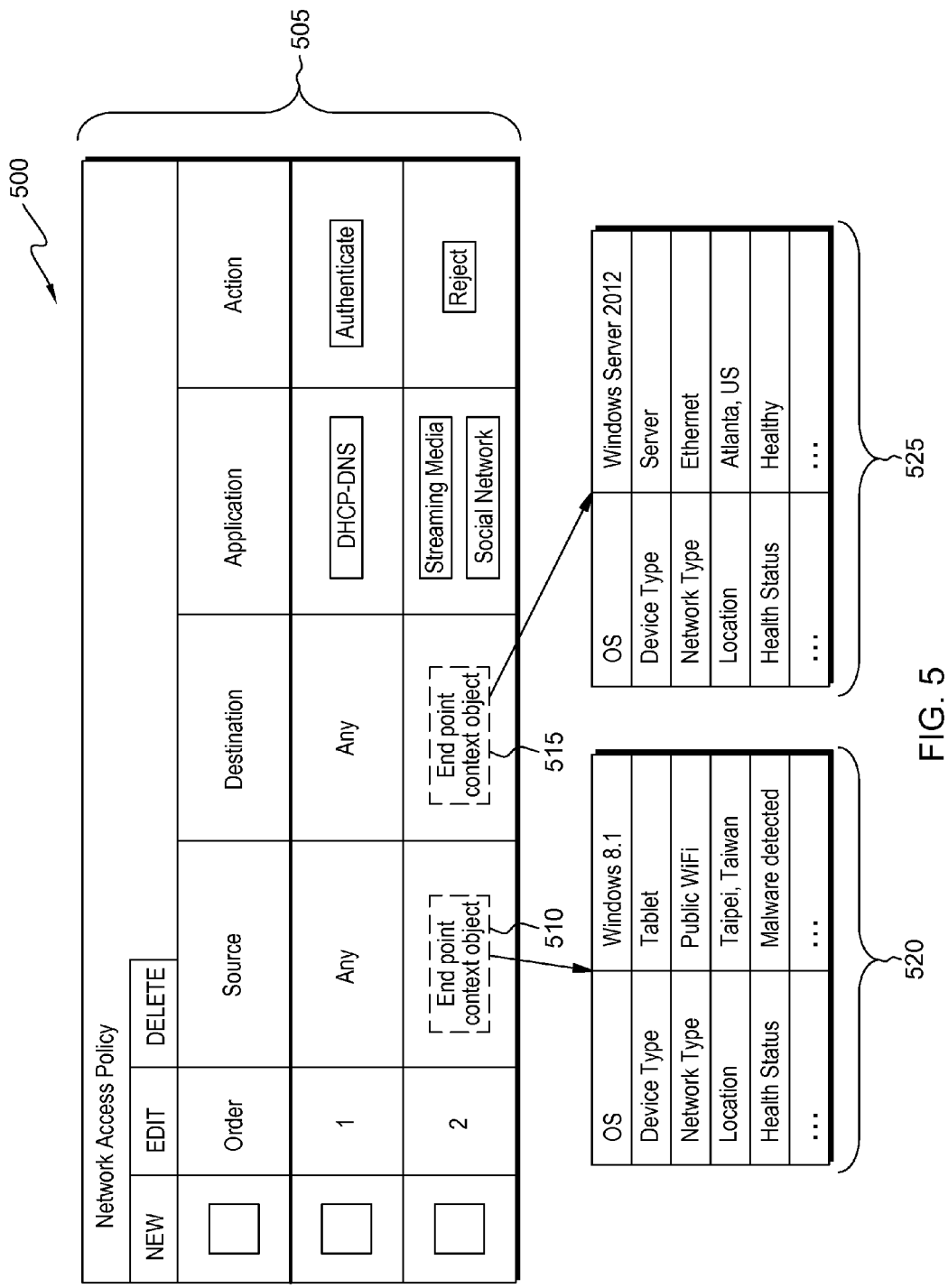
FIG. 5 depicts an example of configuration information of a network access policy, in accordance with an embodiment of the present invention.

FIG. 5 depicts an example 500 of configuration information of a network access policy, in accordance with an embodiment of the present invention.

In a computer interface with a user, window 505 adds context, attributes, and information as an object for both a "Source" and a "Destination," in order to configure the network access policy (i.e., NAP 205). Window 505 allows a user to determine a course of action to take and an order to carry out applications. Additionally, the specific purpose of the application such as "streaming media" is denoted in Window 505. There are multiple ways to send the end-point knowledge to next-gen IPS 210 for information correlation. In these embodiments, NAP 205 does not bind with any certain mechanisms of information syncing between end-point and IPS device. "Source" 510 and "Destination" 515 are end points context objects serving as a source and destination, respectively. The "Action" depicted in window 505 is described in more detail with respect to FIG. 8 (i.e., dropping packets and forwarding packets). Information windows 520 and 525 list the specific information pertaining to these end-point objects such as the operating system (OS), device type, network type, location, and health status.

Figure 6:
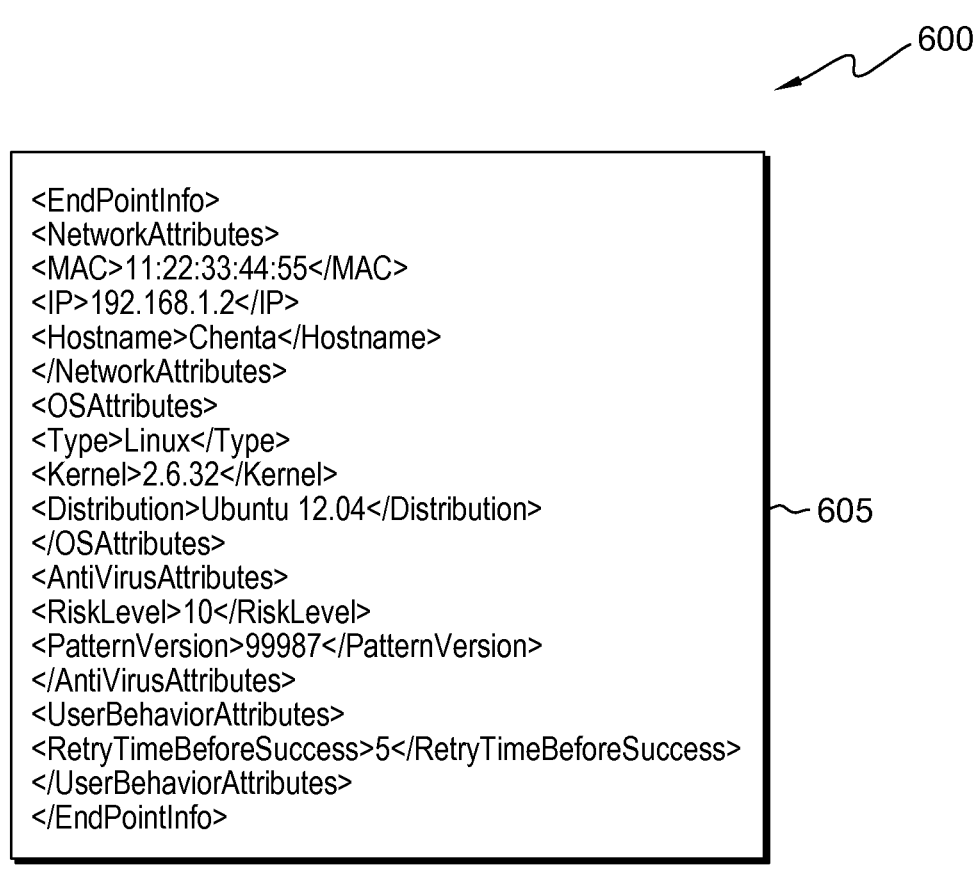
FIG. 6 depicts an example of an end-point attribute in XML encoded format, in accordance with an embodiment of the present invention.

FIG. 6 depicts an example of an end-point attribute 600 in XML encoded format, in accordance with an embodiment of the present invention.

In a preferred exemplary embodiment, an out-of-band channel is utilized to send the end-point attributes to a next-gen IPS device in XML format. When the IPS device receives the end-point attributes, it will map them to the network flows sent from the end-point. In this exemplary embodiment, attributes-to-flow mapping is carried out by using the IP address attached in the end-point attributes to match the IP address in the packet. Code 605 is an example of an end-point attribute in XML format.

Figure 7:
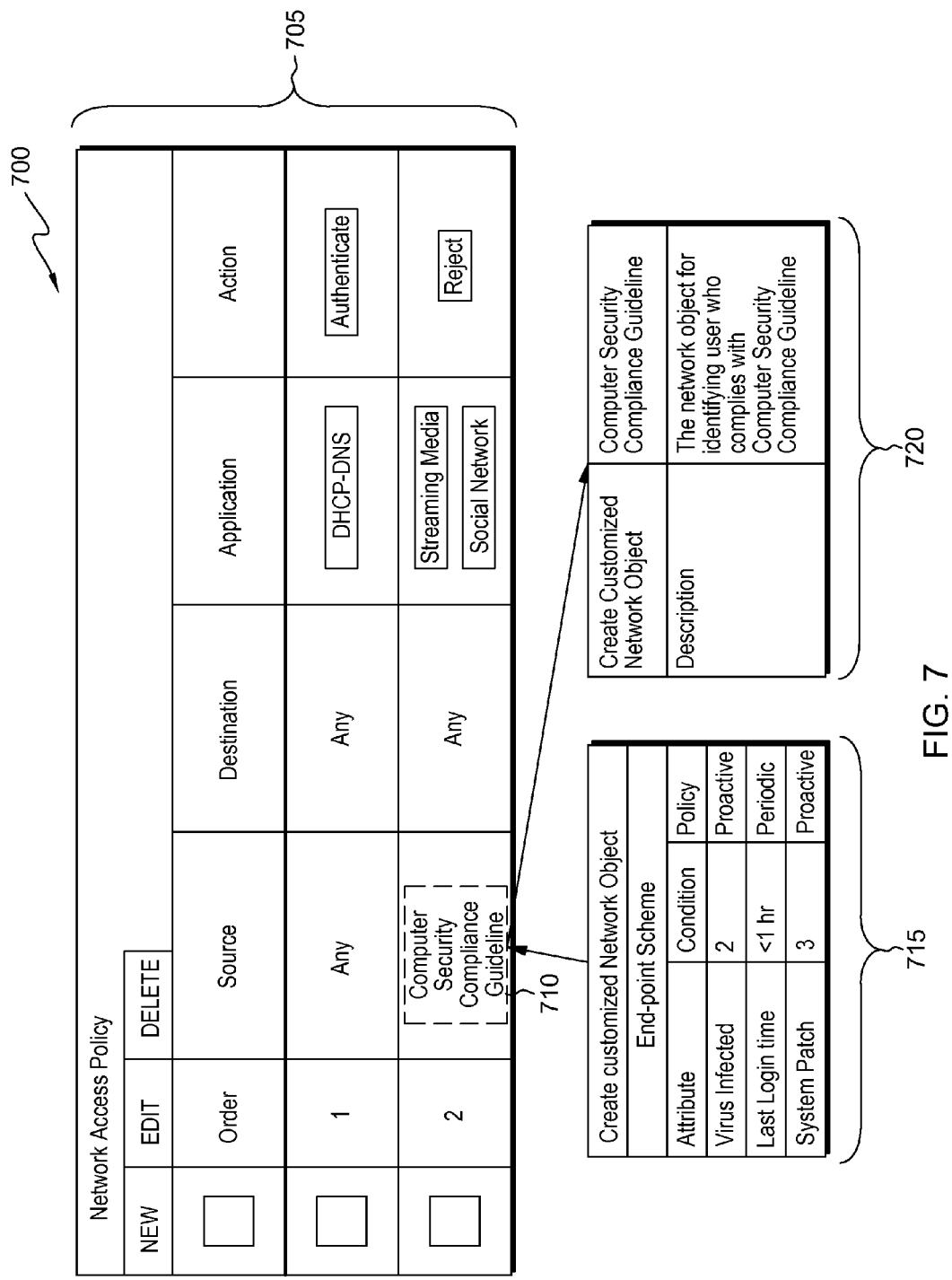
FIG. 7 depicts an example of a mechanism to consume end-point specific information to create customized network objects, in accordance with an embodiment of the present invention.

FIG. 7 depicts an example of a mechanism 700 to consume end-point specific information to create customized network objects, in accordance with an embodiment of the present invention.

In this exemplary embodiment, a mechanism consumes an end-point specific information scheme to create customized network objects based on normalized end-point information schema. Configuration window 705 applies the customized network object (CNO) in NAP 205. Normalization of the end-point information is discussed in further detail with respect to FIG. 10A and FIG. 10B. In configuration window 705, a computer security compliance guideline is the CNO of interest as indicated by highlight 710. Upon consuming end-point specific information, a window to create a customized network object is shown as window 715. A proactive approach is utilized by the network object module to provide the greatest amount of security while retrieving information from the end-points. Additionally, a periodical approach is utilized by the network object module for regular network flow while retrieving information from the end-points. The end-point specific information consumed in order to create customized network objects are listed within window 715. Description window 720 contains a more detailed account of the functions of a new CNO. For example, the function of a computer security compliance guideline is mentioned in description window 720.

Figure 8:
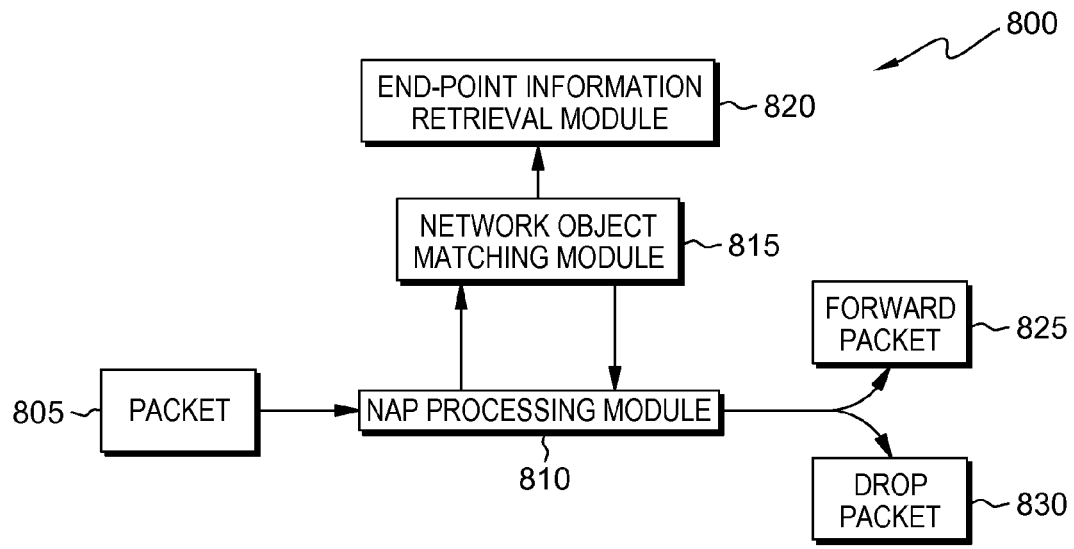
FIG. 8 depicts a flowchart illustrating operational steps for information retrieval from end-points, in accordance with an embodiment of the present invention.

FIG. 8 depicts a flowchart illustrating the mechanism of information retrieval from end-points, in accordance with an embodiment of the present invention.

Packet 805 is received by the network device and delivered to Network Access Policy (NAP) processing module 810 to determine whether the packet complies with security policy.

NAP processing module 810 receives the packet. Based on rules defined in NAP 205, the packet may be checked to determine whether or not it matches the predefined network objects. The packet delivered to the network object matching module is checked against the network object (including the customized network object).

Network object matching module 815 based on NAP 205 determines the mode of end-point information retrieval. A proactive or periodic approach to retrieve the end-point information for matching the object may be utilized. In other embodiments, approaches other than the proactive or periodic approach may retrieve the end-point information. A subscribed approach can be applied to subscribe the end-point information. When any content of the subscribed subjects is changed, end-point information retrieval module 820 will be notified and the content will be synced. A waiting agent which sends the information is not required when NAP 205 needs to know the related information. During end-point information retrieval, information is retrieved via a proactive approach from other entities such as end agents, databases, and security information and event management (SIEM) module from the network object matching module. During end-point information retrieval, information is sent via a periodic approach to the network object matching module from the other entities such as end agents, databases, and SIEM module. The information which is shared and exchanged comprises asset information, location, connection data, health status, etc. The proactive approach provides the maximum security by ensuring that the end-point information is transferred and consumed by the NAP processing module 810.

Network object matching module 815 returns the matched result from end-point information retrieval module 820 to the NAP processing module 810. The network object matching module 815 can talk to the database module to gather the needed information. The end-point can report the information periodically and the information will be stored in the database. If the traffic is suspicious, next-gen IPS 210 may proactively retrieve the necessary information from the end-points automatically.

NAP processing module 810 will either forward or drop the packet based on the results. Forward packet 825 is relayed to the next-gen IPS 210. Drop packet 830 is not relayed to the next-gen IPS 210. The decision to forward or drop the packet is based on the "Action" as depicted in window 505 of FIG. 5.

Figure 9:
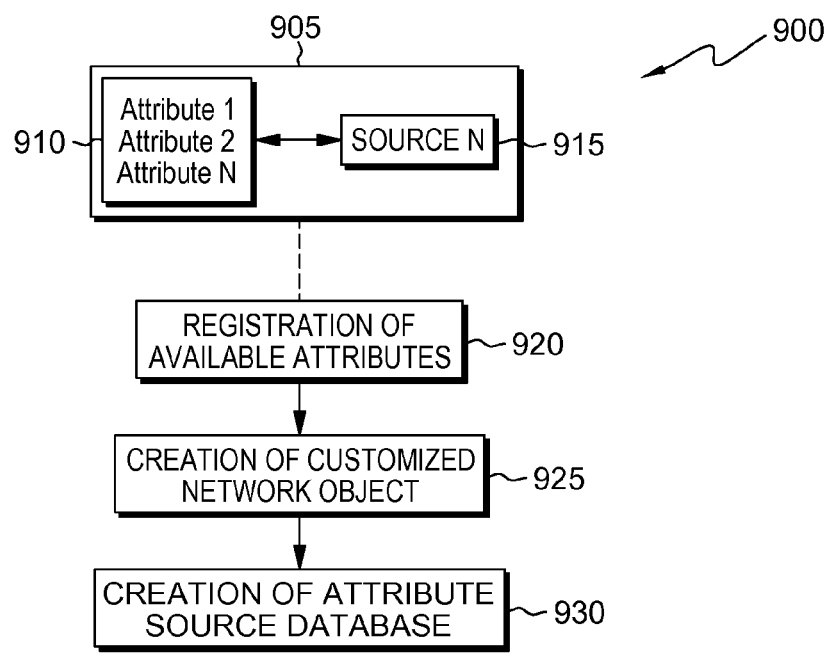
FIG. 9 depicts a flowchart illustrating operational steps for the creation of a customized network access object, in accordance with an embodiment of the present invention.

FIG. 9 depicts a flowchart illustrating the creation of a customized network access object, in accordance with an embodiment of the present invention.

Group 905 contains a list of attributes associated with a source. Set of attributes 910 are available and its source name 915 are attributes available for eventually creating a customized network object. The set of attributes 910 and source name 915 are analyzed by the end-points.

In step 920, the end-points initiate the registration of available attributes to the next-gen IPS 210 for creating a customized network object.

In step 925, next-gen IPS 210 initiates the creation of a customized network object. A user will then see a window resembling that of window 715 in FIG. 7.

In step 930, next-gen IPS 210 initiates the creation of an attribute source database. Next-gen IPS 210 keeps source information of each attribute during a proactive query during a matching process as described in FIG. 8.

Figure 10A:
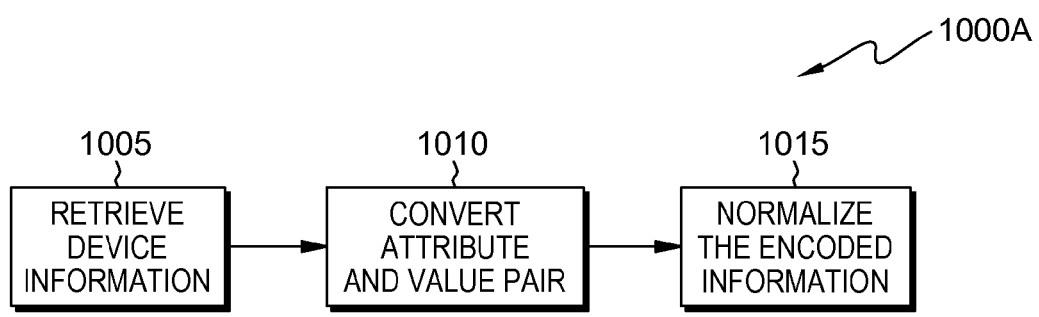
FIG. 10A depicts a flowchart illustrating end-point information normalization, in accordance with an embodiment of the present invention.

FIG. 10A depicts a flowchart illustrating end point information normalization, in accordance with an embodiment of the present invention.

In step 1005, an end-point device retrieves device information. In this exemplary embodiment, the device information includes an attribute and corresponding value pair (i.e. a fundamental data representation in computing systems and applications). Common categories pertaining to end-point devices include: systems (i.e., defined generic objects in the scope of hardware, firmware, OS and kernel module related information); software (e.g., defined generic objects in software and libraries); users (i.e., defined generic objects related to user information); and customized objects (i.e., user defined objects).

In step 1010, the end-point device converts the attribute and value pair into an intermediate format. In this exemplary embodiment, end-point device converts the attribute and value pair into XML format. In other exemplary embodiments, markup languages besides XML may be applied to encode the attribute and value pair. An example of the XML encoded attribute and value pair is depicted with respect to FIG. 6.

In step 1015, the end-point device normalizes the encoded information. In this exemplary embodiment, the XML encoded attribute and value pair are normalized by a series of conversions to encode an attribute and value for further processing. The information refers to the attribute and value pair on the end-point device.

Figure 10B:
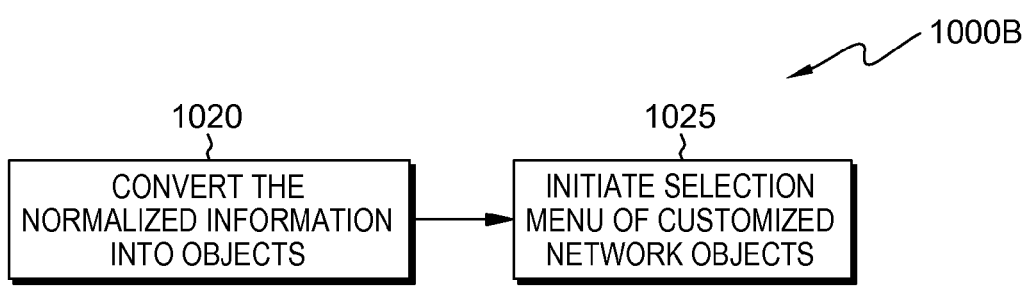
FIG. 10B depicts a flowchart illustrating IPS consumption of normalized information, in accordance with an embodiment of the present invention.

FIG. 10B depicts a flowchart illustrating IPS consumption of normalized information, in accordance with an embodiment of the present invention.

In step 1020, next-gen IPS 210 converts the normalized information into objects. Conversion of the normalized information (from step 1015 in FIG. 10A) into objects allows next-gen IPS 210 to consume the normalized information content.

In step 1025, next-gen IPS 210 initiates a selection menu of customized network objects as depicted in FIG. 7. The selection menu of customized network objects allows a user to select objects from NAP 205.

Figure 11:
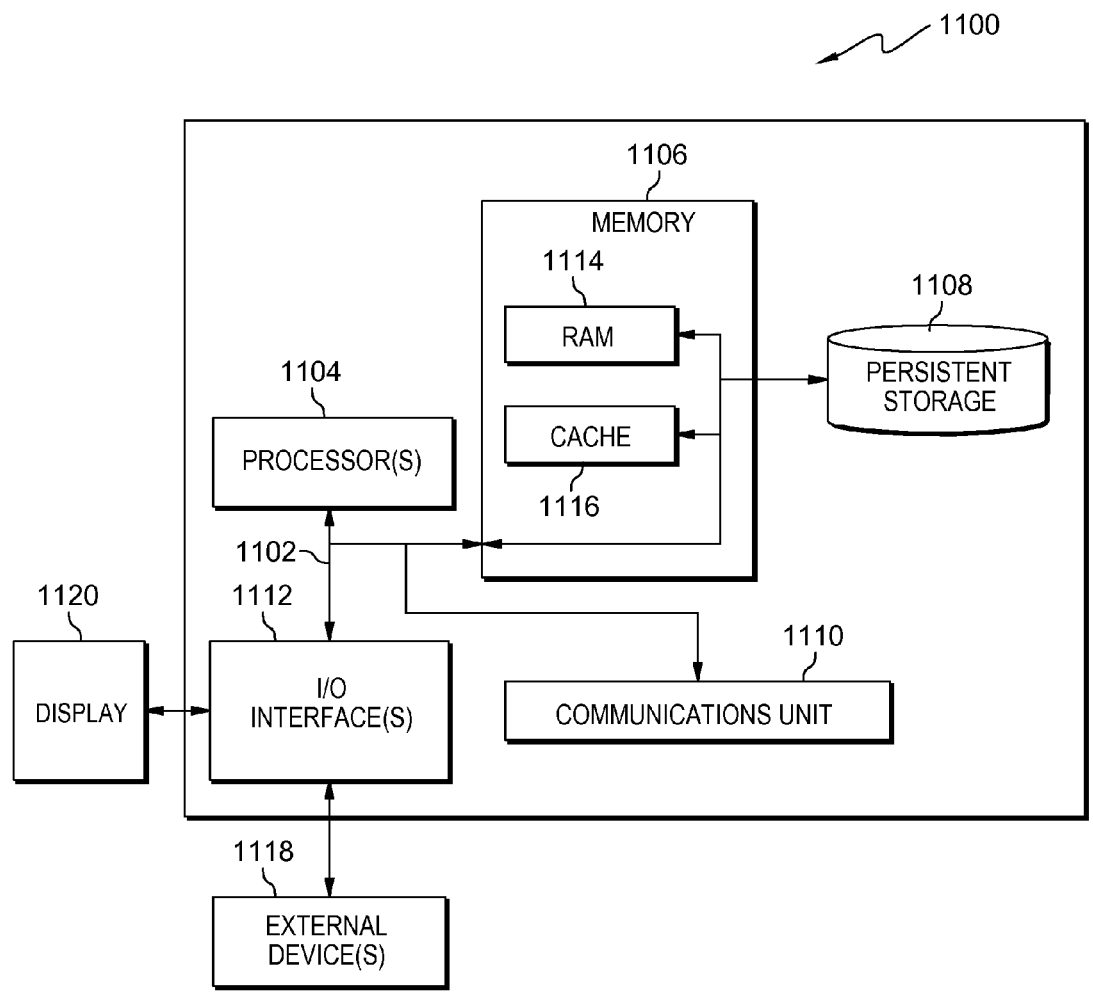
FIG. 11 depicts a block diagram of components of a computing device, generally designated 1100, in accordance with an illustrative embodiment of the present invention.

FIG. 11 depicts a block diagram of components of a computing device, generally designated 1100, in accordance with an illustrative embodiment of the present invention. It should be appreciated that FIG. 11 provides only an illustration of one implementation and does not imply any limitations with regard to the environments in which different embodiments may be implemented. Many modifications to the depicted environment may be made.

Computing device 1100 includes communications fabric 1102, which provides communications between computer processor(s) 1104, memory 1106, persistent storage 1108, communications unit 1110, and input/output (I/O) interface(s) 1112. Communications fabric 1102 can be implemented with any architecture designed for passing data and/or control information between processors (such as microprocessors, communications and network processors, etc.), system memory, peripheral devices, and any other hardware components within a system. For example, communications fabric 1102 can be implemented with one or more buses.

Memory 1106 and persistent storage 1108 are computer readable storage media. In this embodiment, memory 1106 includes random access memory (RAM) 1114 and cache memory 1116. In general, memory 1106 can include any suitable volatile or non-volatile computer readable storage media.

Program instructions and data used to practice embodiments of the present invention may be stored in persistent storage 1108 for execution and/or access by one or more of the respective computer processors 1104 via one or more memories of memory 1106. In this embodiment, persistent storage 1108 includes a magnetic hard disk drive. Alternatively, or in addition to a magnetic hard disk drive, persistent storage 1108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1108.

Communications unit 1110, in these examples, provides for communications with other data processing systems or devices. In these examples, communications unit 1110 includes one or more network interface cards. Communications unit 1110 may provide communications through the use of either or both physical and wireless communications links. Program instructions and data used to practice embodiments of the present invention may be downloaded to persistent storage 1108 through communications unit 1110.

I/O interface(s) 1112 allows for input and output of data with other devices that may be connected to computing device 1100. For example, I/O interface 1112 may provide a connection to external devices 1118 such as a keyboard, keypad, a touch screen, and/or some other suitable input device. External devices 1118 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 1108 via I/O interface(s) 1112. I/O interface(s) 1112 also connect to a display 1120.

Display 1120 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for exchanging information, the method comprising the steps of:

facilitating, by one or more processors, secure communications between an intrusion prevention system (IPS) and at least one end-point, wherein the IPS and the at least one end-point share a first commonly shared information plane;

configuring, by one or more processors, a network access policy (NAP) wherein the NAP works in conjunction with the IPS;

integrating, by one or more processors, a customized network object (CNO) into the NAP, wherein the CNO comprises a set of attributes;

utilizing, by one or more processors, retrieved information from the at least one end-point;

sending, by the IPS, the set of attributes to a database;

processing, by one or more processors, normalized information comprising the set of attributes and associated value pairs;

extending, by one or more processors, a tuple from the IPS to the at least one end-user, wherein the tuple derives from the set of attributes;

utilizing, by one or more processors, a second commonly shared data plane, wherein the second commonly shared data plane:

(a) derives from a first information plane associated with the IPS and a second information plane associated with the at least one end-point, and (b) contains attributes which are different from attributes in the first commonly shared information plane; and implementing, by one or more processors, a security policy by leveraging the second commonly shared data plane.

2. The method of claim 1, further comprising:

controlling, by one or more processors, network traffic into the IPS and the at least one end-point;

placing, by one or more processors, attributes which were previously associated with the IPS and attributes which were previously associated with the at least one end-point within the second commonly shared information plane; and maintaining, by one or more processors, attributes of the first commonly shared information plane.

3. The method of claim 1, wherein configuring the NAP, comprises:

retrieving, by one or more processors, information from the IPS;

retrieving, by one or more processors, information from the at least one end-point; and transforming, by one or more processors, attributes associated with at least one of: the IPS and the at least one end-point, into a tuple, wherein the tuple is implemented as a data structure in the NAP, to facilitate matching attributes collected from multiple sources.

4. The method of claim 1, further comprising, creating CNOs, wherein creating the CNOs comprises:

consuming, by one or more processors, retrieved information from the at least one end-point; and retrieving, by one or more processors, the end-point information bound to a network flow.

5. The method of claim 1, wherein utilizing the retrieved information from the at least one end-point, comprises:
utilizing, by one or more processors, a first type of approach for increased security during end-point information retrieval;
utilizing, by one or more processors, a second type of approach for a network flow during end-point information retrieval;
matching, by one or more processors, a set of data packets with a network object via a matching module;
sending, by one or more processors, a set of matched data packets to a network processing module;
forwarding, by one or more processors, a first set of matched data packets to the IPS; and
precluding, by one or more processors, a second set of matched data packets from being sent to the IPS.

6. The method of claim 1, wherein sending, by the IPS, the set of attributes to the database, comprises:
registering, by one or more processors, available attributes of the at least one end-point to create CNOs.

7. The method of claim 1, wherein processing normalized information comprising the set of attributes and associated value pairs, comprises:
converting, by one or more processors, the set of attributes and associated value pairs into an intermediate format;
normalizing, by one or more processors, the converted set of attributes and associated value pairs which are in the intermediate format;
converting, by one or more processors, the converted intermediate format to the CNO; and
initiating, by one or more processors, a menu with a user interface comprising a customized network object selection from the NAP.

8. A computer program product for exchanging information, the computer program product comprising:
a computer readable storage medium and program instructions stored on the computer readable storage medium, the program instructions comprising:
program instructions to facilitate secure communications between an intrusion prevention system (IPS) and at least one end-point, wherein the IPS and the at least one end-point share a first commonly shared information plane;
program instructions to configure a network access policy (NAP) wherein the NAP works in conjunction with the IPS;
program instructions to integrate a customized network object (CNO) into the NAP, wherein the CNO comprises a set of attributes;
program instructions to utilize retrieved information from the at least one end-point;
program instructions to send the set of attributes to a database;
program instructions to process normalized information comprising the set of attributes and associated value pairs;
program instructions to extend a tuple from the IPS to the at least one end-user, wherein the tuple derives from the set of attributes;
program instructions to utilize a second commonly shared data plane, wherein the second commonly shared data plane:
(a) derives from a first information plane associated with the IPS and a second information plane associated with the at least one end-point, and
(b) contains attributes which are different from attributes in the first commonly shared information plane; and
program instructions to implement a security policy by leveraging the second commonly shared data plane.

9. The computer program product of claim 8, further comprising:
program instructions to control network traffic into the IPS and the at least one end-point;
program instructions to place attributes which were previously associated with the IPS and attributes which were previously associated with the at least one end-point within the second commonly shared information plane; and
program instructions to maintain attributes of the first commonly shared information plane.

10. The computer program product of claim 8, wherein program instructions to configure the NAP, comprise:
program instructions to retrieve information from the IPS;
program instructions to retrieve information from the at least one end-point; and
program instructions to transform attributes associated with at least one of: the IPS and the at least one end-point, into a tuple, wherein the tuple is implemented as a data structure in the NAP, to facilitate matching attributes collected from multiple sources.

11. The computer program product of claim 8, further comprising, program instructions to create CNOs, wherein creating the CNOs comprise:
program instructions to consume retrieved information from the at least one end-point; and
program instructions to retrieve the end-point information bound to a network flow.

12. The computer program product of claim 8, wherein program instructions to utilize the retrieved information from the at least one end-point, comprise:
program instructions to utilize a first type of approach for increased security during end-point information retrieval;
program instructions to utilize a second type of approach for a network flow during end-point information retrieval;
program instructions to match a set of data packets with a network object via a matching module;
program instructions to send a set of matched data packets to a network processing module;
program instructions to forward a first set of matched data packets to the IPS; and
program instructions to preclude a second set of matched data packets from being sent to the IPS.

13. The computer program product of claim 8, wherein program instructions to send the set of attributes to a database, comprise:
program instructions to register available attributes of the at least one end-point to create the CNOs.

14. The computer program product of claim 8, wherein program instructions to process normalized information comprising the set of attributes and associated value pairs, comprise:
program instructions to convert the set of attributes and associated value pairs into an intermediate format;
program instructions to normalize the converted set of attributes and associated value pairs which are in the intermediate format;
program instructions to convert the converted intermediate format to a CNO; and program instructions to initiate a menu with a user interface comprising a customized network object selection from the NAP.

15. A computer system for exchanging information, the computer system comprising:
one or more computer processors;
one or more computer readable storage media;
program instructions stored on the one or more computer readable storage media for execution by at least one of the one or more processors, the program instructions comprising:
program instructions to facilitate secure communications between an intrusion prevention system (IPS) and at least one end-point, wherein the IPS and the at least one end-point share a first commonly shared information plane;
program instructions to configure a network access policy (NAP) wherein the NAP works in conjunction with the IPS;
program instructions to integrate a customized network object (CNO) into the NAP, wherein the CNO comprises a set of attributes;
program instructions to utilize retrieved information from the at least one end-point;
program instructions to send the set of attributes to a database;
program instructions to process normalized information comprising the set of attributes and associated value pairs;
program instructions to extend a tuple from the IPS to the at least one end-user, and wherein the tuple derives from the set of attributes;
program instructions to utilize a second commonly shared data plane, wherein the second commonly shared data plane:
 (a) derives from a first information plane associated with the IPS and a second information plane associated with the at least one end-point, and
 (b) contains attributes which are different from attributes in the first commonly shared information plane; and
program instructions to implement a security policy by leveraging the second commonly shared data plane.

16. The computer system of claim 15, further comprising:
program instructions to control network traffic into the IPS and the at least one end-point;
program instructions to place attributes which were previously associated solely with the IPS and attributes which were previously associated solely with the at least one end-point within the second commonly shared information plane; and
program instructions to maintain attributes of the first commonly shared information plane.

17. The computer system of claim 15, wherein program instructions to configure the NAP, comprise:
program instructions to retrieve information from the IPS;
program instructions to retrieve information from the at least one end-point; and
program instructions to transform attributes associated with at least one of: the IPS and the at least one end-point, into a tuple, wherein the tuple is implemented as a data structure in the NAP, to facilitate matching attributes collected from multiple sources.

18. The computer system of claim 15, further comprising, program instructions to create CNOs, wherein creating the CNOs comprise:
program instructions to consume retrieved information from the at least one end-point; and
program instructions to retrieve the end-point information bound to a network flow.

19. The computer system of claim 15, wherein program instructions to utilize the retrieved information from the at least one end-point, comprise:
program instructions to utilize a first type of approach for increased security during end-point information retrieval;
program instructions to utilize a second type of approach for a network flow during end-point information retrieval;
program instructions to match a set of data packets with a network object via a matching module;
program instructions to send a set of matched data packets to a network processing module;
program instructions to forward a first set of matched data packets to the IPS; and
program instructions to preclude a second set of matched data packets from being sent to the IPS.

20. The computer system of claim 15, wherein program instructions to process normalized information comprising the set of attributes and associated value pairs, comprise:
program instructions to convert the set of attributes and associated value pairs into an intermediate format;
program instructions to normalize the converted set of attributes and associated value pairs which are in the intermediate format;
program instructions to convert the converted intermediate format to the CNO; and
program instructions to initiate a menu with a user interface comprising a customized network object selection from the NAP.

* * * * *